United States Patent
Tujino et al.

[11] Patent Number: 6,146,330
[45] Date of Patent: Nov. 14, 2000

[54] ULTRASOUND DIAGNOSIS APPARATUS FOR GENERATING AN IMAGE BASED ON EXTRACTED HARMONICS COMPONENT

[75] Inventors: Hiroyuki Tujino, Cleveland, Ohio; Yoshitaka Mine, Tochigi-ken; Takuya Sasaki, Otawara, both of Japan

[73] Assignee: Kabushiki Kaisha Toshiba, Kawasaki, Japan

[21] Appl. No.: 09/288,851

[22] Filed: Apr. 9, 1999

[30] Foreign Application Priority Data

Apr. 10, 1998 [JP] Japan .................................. 10-099396

[51] Int. Cl.[7] ...................................................... A61B 8/00
[52] U.S. Cl. ........................... 600/443; 600/447; 600/458
[58] Field of Search .................................. 600/440, 443, 600/447, 454, 458

[56] References Cited

U.S. PATENT DOCUMENTS

| | | | |
|---|---|---|---|
| 5,833,613 | 11/1998 | Averkiou et al. | 600/440 |
| 5,897,500 | 4/1999 | Zhao | 600/443 |
| 5,908,389 | 6/1999 | Roundhill et al. | 600/443 |
| 5,961,460 | 10/1999 | Guracar et al. | 600/440 |
| 6,036,643 | 3/2000 | Criton et al. | 600/454 |

*Primary Examiner*—Marvin M. Lateef
*Assistant Examiner*—Ali M. Imam
*Attorney, Agent, or Firm*—Oblon, Spivak, McClelland, Maier & Neustadt, P.C.

[57] ABSTRACT

An ultrasound wave is transmitted to a target object through an ultrasound probe, and an echo signal returning from the target object is received through the ultrasound probe. In a fundamental wave mode, a fundamental wave component is extracted from the echo signal, and an image is generated based on the fundamental wave component. In a harmonics mode, a harmonics component is extracted, and an image is generated based on the harmonics component. The focal strength ratio of the ultrasound wave in the harmonica mode is changed between in the harmonics mode and in the fundamental wave mode. As a result, images with high quality can be obtained in both the fundamental wave mode and the harmonics mode.

25 Claims, 9 Drawing Sheets

SOUND PRESSURE DISTRIBUTION

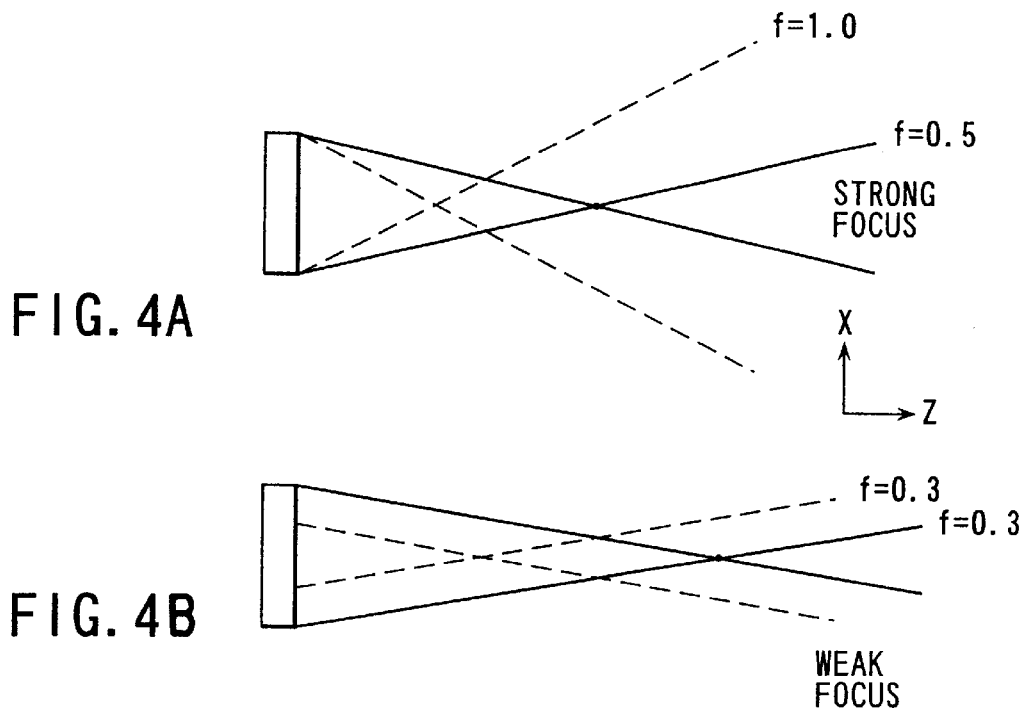
FIG. 4A
FIG. 4B
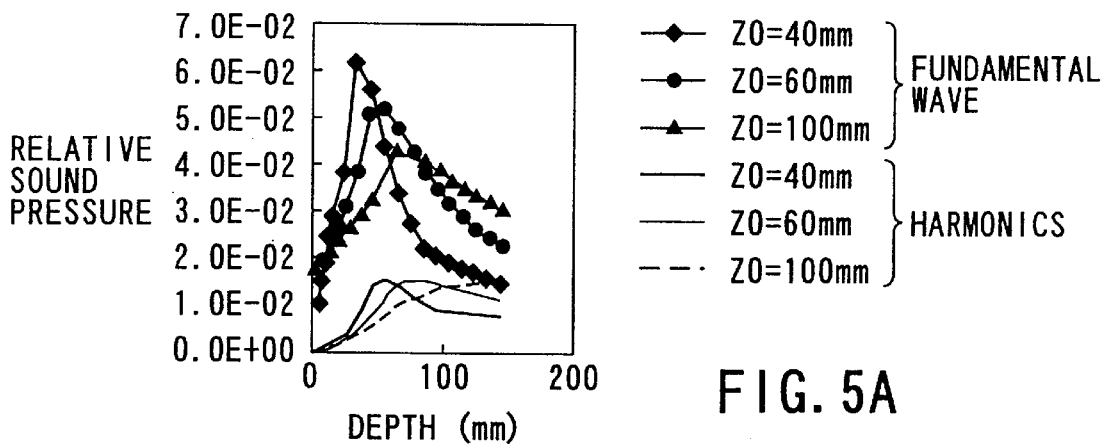
FIG. 5A
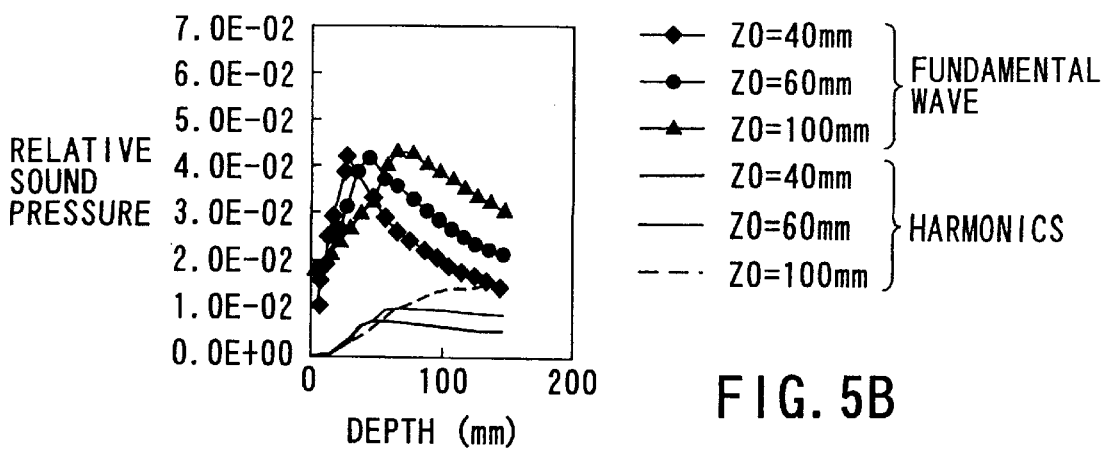
FIG. 5B

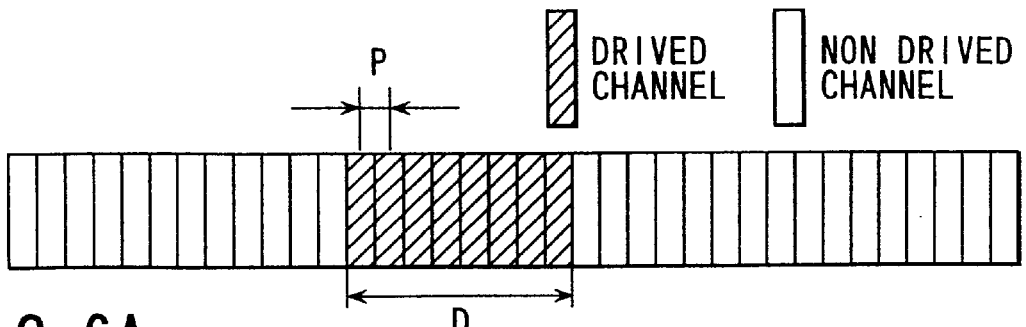
FIG. 6A
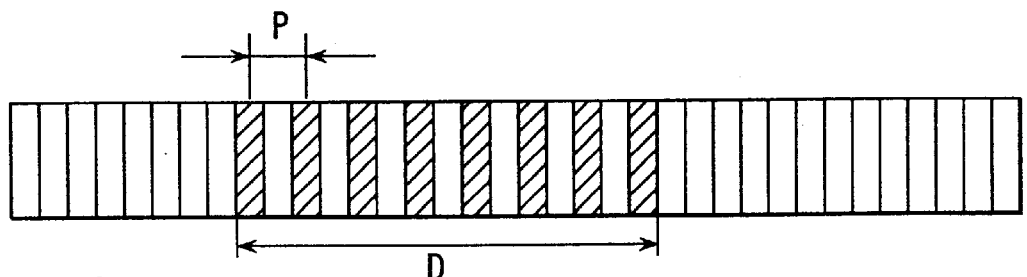
FIG. 6B
FIG. 7A
DRIVED CHANNEL IN FUNDAMENTAL WAVE MODE
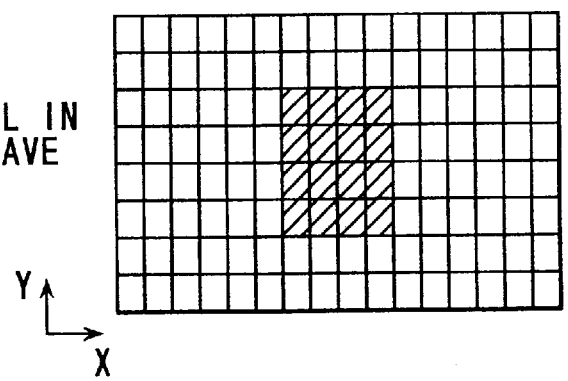
FIG. 7B
DRIVED CHANNEL IN HARMONICS MODE
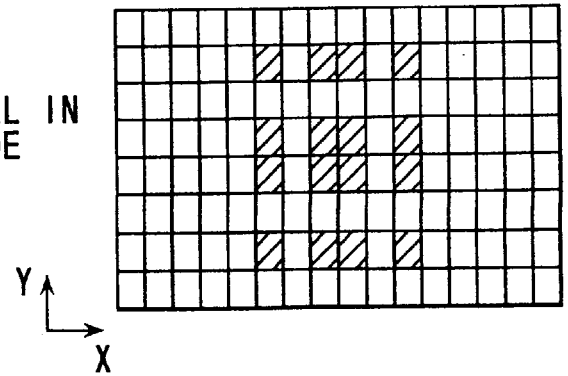

ULTRASOUND DIAGNOSIS APPARATUS FOR GENERATING AN IMAGE BASED ON EXTRACTED HARMONICS COMPONENT

BACKGROUND OF THE INVENTION

The present invention relates to an ultrasound diagnosis apparatus which extracts a harmonics component generated by non-liner ultrasound propagation from echo signal, and generates and displays an ultrasound image based on the extracted harmonics component.

The above method called a harmonic imaging method (HI) is a method which detects and images a harmonics component included in a signal from an ultrasound wave (for example, to transmit an ultrasound wave at 2 MHz and image at a high frequency of 4 MHz), and is developed for the purpose of more efficiently detecting an ultrasound contrast medium composed of micro bubbles.

Micro bubbles has a strong non-liner diffusion characteristic, and the diffusion signal thereof contains a large harmonics component in comparison with an organic tissue. Hence, by detecting only the harmonics component, fine blood perfusion which will be normally hidden in an echo from peripheral tissues (in case of using a base wave) can be imaged.

In recent years, attention has been paid to a Tissue Harmonic Imaging (THI) method, as another application of the Harmonic Imaging (HI) method. This method takes into consideration the image improvement effect of the Harmonic Imaging method, and therefore, a high-contrast B-mode image with reduced noise can be obtained for a so-called tough patient. Thus, this method is characterized in excellent rendering of an endocardium or the like.

In the Harmonic Imaging method, a non-linear "oscillation" signal of a contrast agent (of micro bubbles is imaged. On the other hand, the Tissue Harmonic Imaging method images a harmonics wave generated by so-called non-linearity of propagation in which a transmitted ultrasound wave is transferred being deformed.

Since the amplitude of this harmonics wave is proportional to the propagation distance of the ultrasound wave and square of the sound pressure of fundamental wave, and is therefore generated, concentrated on the central axis (i.e., in the region where the sound pressure is high). That is, it is possible to form a sharp ultrasound beam having a narrow main lobe and a low side lobe level, compared with the case of using a basic wave.

Since a beam having a narrow beam width and a low side lobe level can thus be formed in the Harmonic Imaging method, the resolution in the azimuth direction is improved by reduction of the beam width, and the contrast resolution is also improved by reduction of the side lobe level.

Although various superiority as described above has been predicted, various problems as follows have occurred when the Tissue Harmonic Imaging is carried out in practice. (1) The harmonics wave is not generated much effectively as expected. (2) The image quality is not much improved in the interested region where the ultrasound wave should have been converged. (3) When the normal imaging is switched to the Tissue Harmonic Imaging, the luminance level of an image greatly rises and drops so that the image is very difficult to watch. (4) If the region of interest is shallow from the surface of a human body, sufficient propagation distance cannot be maintained so that the harmonics component does not occur enough and the imaging is rendered difficult.

BRIEF SUMMARY OF THE INVENTION

The present invention has an object of providing an ultrasound diagnosis apparatus capable of improving the image quality of harmonic imaging.

According to the present invention, the Focal strength ratio (Aperture/Focal length), transmission diameter, frequency, or focus depth of an ultrasound wave can be changed between in the fundamental wave mode and in the harmonics mode. As a result, it is possible to obtain images with excellent quality both in the fundamental wave mode and in the harmonics mode.

According to the present invention, a marker indicating a position where the generation level of harmonics component is maximized is displayed together with an ultrasound wave image mainly consisting of a component having a non-fundamental frequency. Therefore, an operator can adjust transmission conditions while grasping the position where the generation level of the harmonics component is maximized. Accordingly, it is possible to obtain a harmonics wave image with excellent quality.

According to the present invention, it is possible to observe the area where the image quality is excellent in each of a fundamental wave image and a harmonics image. In other words, both images can compensate for their own areas where the image quality is low, so that the total image can be observed excellently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a schematic view showing a strong-focus condition in the present embodiment.

FIG. 4B is a schematic view showing a weak-focus condition in the present embodiment.

FIG. 5A is a graph showing sound pressure distributions of fundamental waves and harmonics waves generated under a strong-focus condition (where the focal strength ratio f=1.0) in the present embodiment.

FIG. 5B is a graph showing sound pressure distributions of fundamental waves and harmonics waves generated under a weak-focus condition (where the focal strength ratio f=0.3) in the present embodiment.

FIG. 6A is a view showing channels driven in the fundamental wave mode (under a weak-focus condition) in the present embodiment.

FIG. 6B is a view showing channels driven in the harmonics mode (under a strong-focus condition) in the present embodiment.

FIG. 7A is a view showing channels driven in the fundamental wave mode (under a weak-focus condition) where the ultrasound probe is of a two-dimensional array type in the present embodiment.

FIG. 7B is a view showing channels driven in the harmonics mode (under a strong-focus condition) where the ultrasound probe is of a two-dimensional array type in the present embodiment.

DETAILED DESCRIPTION OF THE INVENTION

In the following, the present invention will be explained on the basis of preferred embodiments with reference to the drawings.

Figure 1:
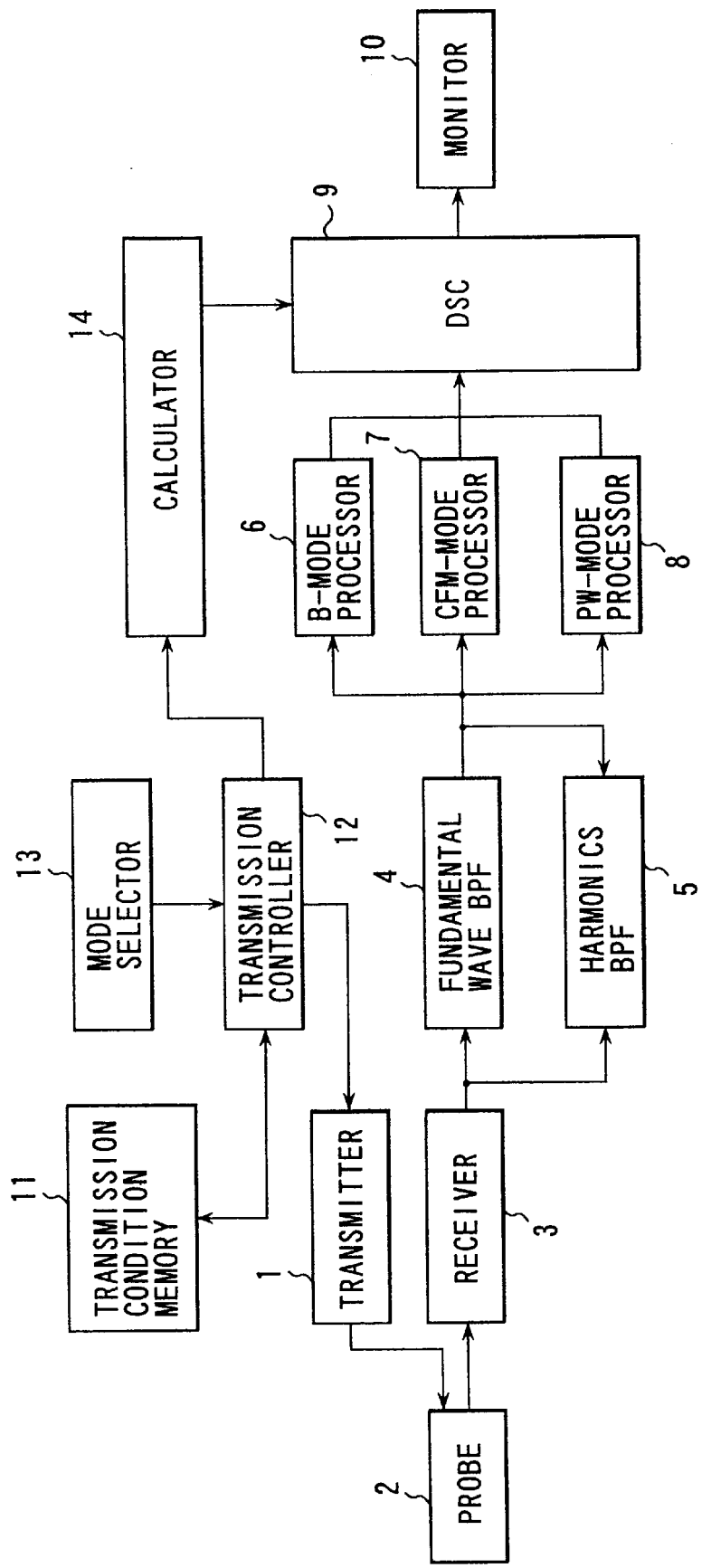
FIG. 1 is a block diagram showing the structure of an ultrasound diagnosis apparatus in a preferred embodiment of the present invention.

FIG. 1 shows a structure of an ultrasound diagnosis apparatus according to the present invention. An ultrasound probe 2 of a multi-channel type has a plurality of piezoelectric elements for performing mutual conversion between electric signals and audio signals. The following explanation will be made supposing that one piezoelectric element forms one channel. A plurality of piezoelectric elements are disposed one-dimensionally or two-dimensionally.

A transmitter 1 connected to the ultrasound probe 2 generates a drive signal (of a high-frequency voltage) for driving a piezoelectric element in accordance with a control signal supplied form a transmission controller 12. This control signal contains a transmission diameter control signal, a focus depth control signal, and a frequency control signal.

Figure 2A:
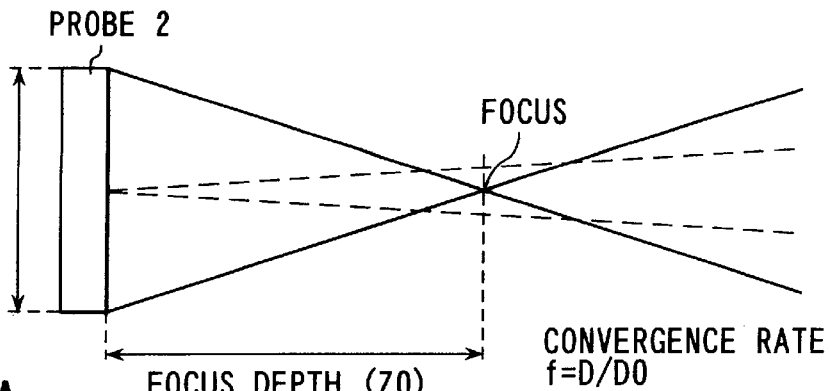
FIG. 2A is a graph explaining a focal strength ratio in the present embodiment.

Among all the channels of the ultrasound probe 2, all or parts of channels are selected as drive channels by the transmission control signal. Note that the whole width from an end to the other end of the plurality of selected channels to be driven is referred to as the transmission diameter D (ref. FIG. 2A). The transmission diameter is adjusted by the transmission diameter control signal.

Figure 2B:
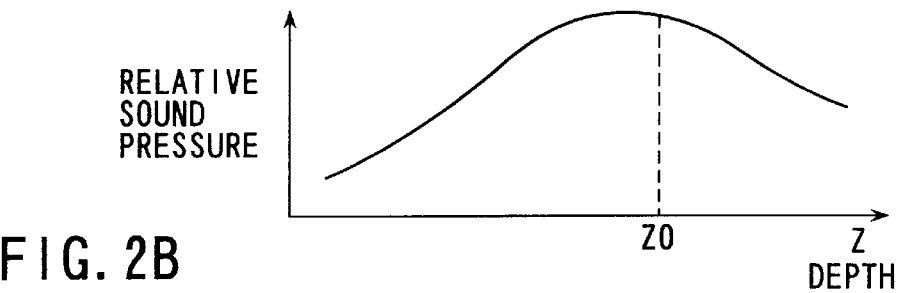
FIG. 2B is a graph showing a sound pressure distribution of a transmitted ultrasound wave in the present embodiment.

The focus depth control signal the delay time of each of channels other than the channels situating at both ends among the drive channels are set with respect to the channels situating at both ends, by the focus depth control signal. The focus depth Z0 is adjusted by the delay control signal (ref. FIG. 2A). The focus means a calculated point to which the phases of ultrasound waves generated from the drive channels are converged, and the sound pressure does not always indicate the maximum value at the focus (ref. FIG. 2B).

Note that the ratio of the transmission diameter to the focus depth Z0 is referred to as a focal strength ratio f in the present specification. As the convergence rate f becomes higher, the ultrasound waves are converged more strongly. Inversely, the ultrasound waves are converged more weakly as the focal strength ratio f becomes lower. This focal strength ratio f is adjusted by the transmission diameter control signal and by the focus depth control signal.

The frequency of the drive signal is adjusted by the frequency control signal, and the center frequency of the ultrasound waves is adjusted thereby.

An ultrasound wave generated from the ultrasound probe 2 is propagated through inside of a diagnosis target, and is reflected by a discontinuous surface of sound impedance existing halfway on the propagation. The ultrasound wave then returns as an echo to the probe 2. The echo contains a harmonics component generated by so-called non-linearity of propagation with which the ultrasound wave is propagated deformed, in addition to a fundamental wave component close to the center frequency of the transmission ultrasound wave.

The echo vibrates mechanically the piezoelectric elements in the probe 2 so as to generate a faint electric signal. The echo signal is taken in by a receiver 3, amplified by a preamplifier, and is thereafter subjected to addition through the same delay processing as performed for transmission.

The echo signal subjected to addition contains a fundamental wave component and a harmonics component. A fundamental band-pass filter 4 is provided in order to extract a fundamental component from the echo signal. Meanwhile, a harmonics band-pass filter 5 is provided in order to extract a harmonics component from the echo signal, e.g., mainly a secondary harmonics component twice higher than the center frequency in this case.

A B-mode processor 6 generates a normal B-mode image based on the fundamental wave component extracted by the fundamental band-pass filter 4 in a fundamental wave mode, and generates a tissue harmonics image based on the harmonics component extracted by the harmonics band-pass filter 5 in a harmonics mode. A color flow mapping mode processor 7 generates a normal color perfusion image based on the fundamental wave component extracted by the fundamental band-pass filter 4 in the fundamental wave mode, and generates a color perfusion image in which the harmonics wave is emphasized, based on the harmonics component extracted by the harmonics band-pass filter 5, in the harmonics mode. Also, a pulse wave mode processor 7 generates a normal frequency spectrum based on the fundamental wave component extracted by the fundamental band-pass filter 4 in the fundamental wave mode, and generates a frequency spectrum in which the harmonics is emphasized, based on the harmonics component extracted by the harmonics band-pass filter 5, in the harmonics mode. These images are displayed on a monitor 10 through a digital scan converter (DSC) 9.

A transmission condition memory 11 stores a plurality of transmission conditions. The plurality of transmission conditions are associated with the depth of the region of interest (ROI) and the mode (which is the fundamental wave mode or harmonics mode). The transmission condition contains drive channel information, focus depth information, and frequency information. A transmission controller 12 obtains a transmission condition associated with the depth of the region of interest set by an operator and the mode (which is the fundamental wave mode or harmonics mode) selected through a mode selector 13 by the operator. The transmission controller 12 generates a transmission diameter control signal, a focus depth control signal, and a frequency control signal, in accordance with the obtained transmission condition.

In accordance with the transmission diameter control signal, focus dept control signal, and frequency control signal generated by the transmission controller 12, a drive signal is supplied to the ultrasound probe 2 from the transmitter 1. In this manner, an ultrasound wave corresponding to these control signals is generated from the ultrasound probe 2.

Also, based on the transmission diameter according to the transmission diameter control signal and the focus depth according to the focus depth control signal, generated by the transmission controller 12, a calculator 14 calculates the depth (which is the maximum sound pressure depth) at which the sound pressure of the harmonics wave has a maximum value. In place of this calculation, the depth at which the sound pressure of the harmonics wave has a maximum value may be previously calculated in accordance with various transmission diameters and focus depths. The calculator 14 outputs maximum sound pressure depth mark data to a digital scan converter 9 such that the maximum sound pressure depth mark is arranged at the position corresponding to the calculated maximum sound pressure depth. In this manner, the maximum sound pressure depth mark is displayed together with an image on the monitor 10.

Figure 3:
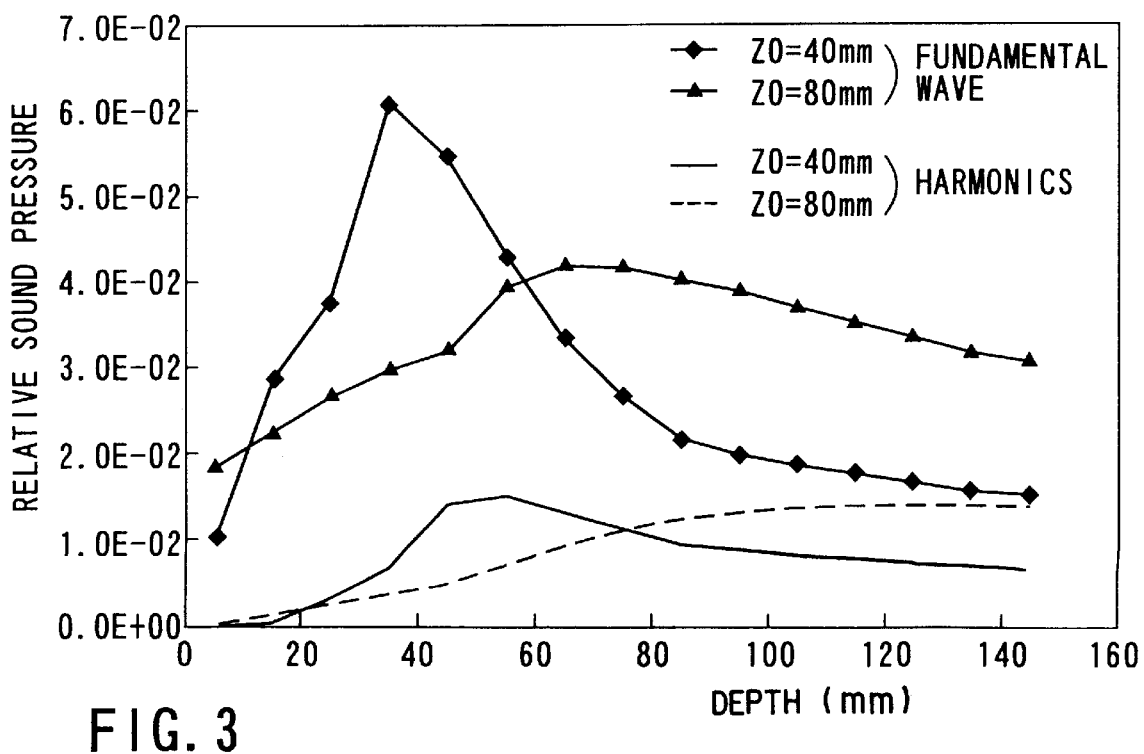
FIG. 3 is a graph showing sound pressure distributions of a fundamental wave and a harmonics wave in the present embodiment.

Next, the transmission conditions in the present embodiment will be explained below. The present inventors have actually measured the sound pressure distribution of the fundamental wave component and the sound pressure distribution of the harmonics component, at two kinds of focus depths of 40 mm and 80 mm. The results are shown in FIG. 3. Note that the focus is defined as a calculated conversion point depending on delay control. The inventors have found that the maximum sound pressure point of the fundamental wave tends to be somewhat shallower than the focus while the maximum sound pressure point tends to be somewhat at the focus. Further, the inventors have estimated that this tendency is caused by the factor that the harmonics wave is generated to be in inverse proportion to the propagation distance of the ultrasound wave and in proportion to the square of the sound pressure of the fundamental wave.

Hence, in the present invention, the transmission condition is set such that the focus depth of the ultrasound wave is let correspond to or slightly deeper than the depth of the region of interest in the fundamental wave mode and is slightly shallower than the depth of the region of interest in the harmonics mode. In this manner, the region involving the maximum sound pressure can be matched with the region of interest in both of the fundamental wave mode and the harmonics mode. Accordingly, the image quality of the region of interest can be improved in any mode.

Next, explanation will be made of a method of efficiently generating the harmonics wave particularly in a shallow portion. Now, the focal strength ratio will be defined again. The focal strength ratio f expresses how much the ultrasound wave is converged. This ratio is a parameter significant for defining the sound pressure distribution of the ultrasound wave and is obtained by "D/Z0" where D is the diameter of the transmission opening and Z0 is the focus depth, as shown in FIG. 2A. As has been known, the diameter D and the focus depth Z0 can be adjusted by changing the number of drive channels and the delay time, respectively.

In the fundamental wave mode, the ultrasound wave is transmitted under a weak-focus condition. Meanwhile, in the harmonics mode, the ultrasound wave is transmitted under a strong-focus condition. The weak-focus condition and the strong focus condition can be defined by an index of focal strength ratio f. The weak-focus condition uses the focal strength ratio f of normal ultrasound imaging and $f \leq 0.3$ is satisfied. Meanwhile, the strong-focus condition uses a higher focal strength ratio f than that of the weak-focus condition and, $f > 0.3$ is satisfied and $f > 0.5$ is satisfied more preferably.

FIG. 4A schematically shows the sound field of the ultrasound wave under the strong-focus condition when the focus rate f is 1.0 and 0.5. Likewise, FIG. 4B schematically shows the sound field of the ultrasound wave under the weak-focus condition when the focus rate f is 0.3. In case where the focal strength ratio f is as relatively small as 0.3, a uniform sound pressure distribution is obtained over a relatively wide range. Inversely, in case where it is relatively large, the ultrasound wave is locally converged.

As is apparent from FIGS. 4A and 4B, in order to obtain uniform image quality over a wide range by an imaging method depending on a normal fundamental wave component, the focal strength ratio should not be very large and is adjusted within a range up to the upper limit of 0.3. Therefore, as the focus depth becomes shallower, the diameter is accordingly reduced to be narrower so that the focal strength ratio might not be changed, as shown in FIG. 4B.

FIGS. 5A and 5B show sound distributions in the sound fields of FIGS. 4A and 4B, respectively. FIG. 5B shows a sound field generally used in an imaging method depending on a normal fundamental wave component, and the sound pressure peak of the fundamental wave component is maintained to be substantially uniform even if the focus is changed. This is a result of maintaining the focal strength ratio to be substantially constant, as has been described previously.

Where generation of a harmonics wave depending on the fundamental-wave sound field is calculated through simulation, the harmonics wave is not uniformly generated in contrast to the uniformity of the fundamental-wave sound field, besides the harmonics wave is not substantially generated in close regions.

Meanwhile, by performing the strong focus as shown in FIGS. 4A and 5B, the harmonics wave component can be generated uniformly and efficiently from close regions.

To summarize the above, the focus of the ultrasound wave is adjusted to or the depth deeper than the region of interest in the fundamental wave mode, while the focus is adjusted to a region shallower than the region of interest in the harmonic mode. In addition, as for the focal strength ratio, the ultrasound wave is transmitted under a weak-focus in which the focal strength ratio is 0.3 or less, in the fundamental wave mode. Meanwhile, in the harmonics mode, the ultrasound wave is transmitted under a strong-focus condition in which the focal strength ratio is as relatively high as 0.5 or more.

By respectively using different conditions for the fundamental wave mode and the harmonics mode, the maximum sound pressure point can be matched with the region of interest in any of the fundamental wave mode and the harmonics mode. As a result, the image quality of the region of interest can be improved in any mode, and it is possible to prevent the place of a high image quality region from being changed when switching the mode between the fundamental wave mode and the harmonics mode of tissue harmonics imaging. Besides, the harmonics wave can be efficiently generated even in a shallow portion.

Note that the transmission condition memory preferably contains a transmission condition for imaging depending on the harmonics component and a transmission condition for imaging depending on the fundamental wave component as separate tables independent from each other, respectively. If separate tables cannot be prepared due to the memory capacity or due to limitations from switching of reference tables, it is possible to adopt a method in which data for the harmonics wave component for stages of close focus and data for the fundamental wave component for distant data are prepared as data for every focus point.

As has been described above, the focus of the ultrasound wave is matched with or deeper than the region of interest in the fundamental wave mode, while the focus is matched with a shallower place than the region of interest in the harmonics mode. In this respect, more specific explanation will be made below. The following supposes a case in which switching is performed from the normal imaging method depending on the fundamental wave to the tissue harmonics imaging method, i.e., from the fundamental wave mode to the harmonics mode.

As described above, a harmonics wave is generated strongly at a place slightly deeper than a fundamental wave, and therefore, the ultrasound wave is not generated sufficiently in the region of interest if the mode is switched without changing the focus of the ultrasound wave. Hence, when thus switching the mode, the transmission condition is also switched so as to make the focus slightly shallower in association with the switching. Accordingly, for example, when the region of interest is at the depth of 50 mm, the focus of the ultrasound wave is directly adjusted to 50 mm in the fundamental wave mode. Meanwhile, the focus of the ultrasound wave is adjusted to the depth of 40 mm in the harmonics mode. In this manner, the place where the harmonics wave component has the maximum sound pressure just matches with the region of interest.

The correspondence of the maximum sound pressure points as described above is stored in the memory 11, and the focus depth is automatically changed so that the depth at which the sound pressure is maximized might not change when the fundamental wave mode is switched to the harmonics mode or inversely. In this manner, the place of the region where the most excellent image quality is obtained does not change even when the imaging method is switched, and therefore, the focus depth need not be manually changed.

As described above, in the harmonics mode, a relatively high value of 0.5 or more is adopted, for example, and the ultrasound wave is transmitted under the strong-focus condition. However, since the focus depth Z0 is determined depending on the region of interest set by an operator, the focal strength ratio f is adjusted depending on the diameter D of the transmission opening.

FIG. 6A shows the drive channels and the transmission diameter D when imaging is performed in the normal fundamental wave mode. FIG. 6B shows the drive channels and the transmission diameter when imaging is performed in the harmonics mode. Cited here is an example in which eight channels are simultaneously driven to generate one raster. In the normal B-mode, the channel pitch is designed, mainly considering the grating lobe, and therefore, adjacent eight channels are driven to form an ultrasound beam to be transmitted. Note that "considering the grating lobe" means that the distance from the main lobe to the grating lobe is obtained by 1/P where the channel pitch is P, as is well known. That is, the shorter the channel pitch, the more distant the grating lobe from the main lobe.

However, in case of a harmonics wave, even if the channel pitch is set with an enlarged interval distance, the grating lobe does not much increase, relative to the enlargement of the interval distance. Therefore, if only eight channels are simultaneously driven, the transmission diameter can be enlarged to obtain a necessary focal strength ratio by driving interspersed eight channels, e.g., by subtracting every second channel. Of course, two among every three channels or more channels may be subtracted. Or, the interval distance may be increased gradually toward the outside of the diameter. Also, it may be considered that each subtracted element is short-circuited to the same pulsar as that of an adjacent element so that two elements constitute one channel, for example.

This concept is also applicable to the case of a probe of a so-called two-dimensional array type as shown in FIGS. 7A and 7B. That is, in the fundamental wave mode, as shown in FIG. 7A, adjacent sixteen channels are simultaneously driven as shown in FIG. 7A. Meanwhile, in the harmonics mode, sixteen channels interspersed in the directions of perpendicular two axes X and Y are simultaneously driven to enlarge the diameter longitudinally and laterally.

In the two-dimensional array, subtracted driving is proposed in order that the number of transmission channels is set within the number of channels which can be simultaneously driven by the system. However, the design of the reference for subtraction is directed so as to reduce occurrence of side lobes and grating lobes under prerequisite of transmission and receiving with use of a fundamental wave. In contrast, according to the present invention, such direction of designing is not necessary.

Figure 8A:
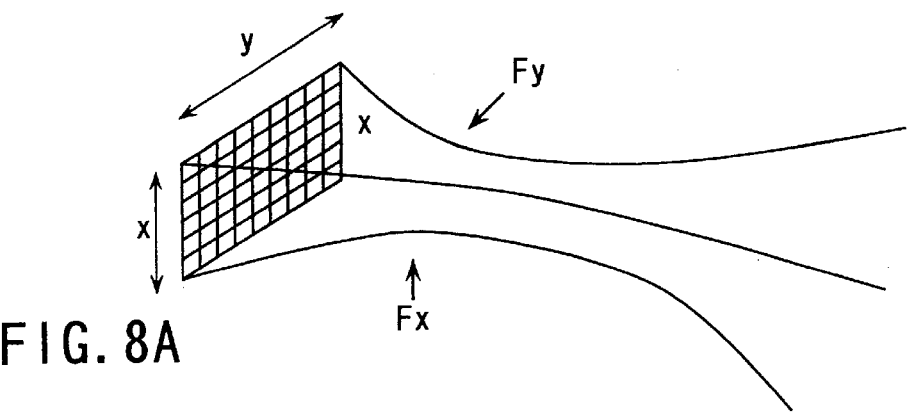
FIG. 8A is a schematic view showing a sound field of an ultrasound wave where a strong-focus condition is applied in both of X- and Y-directions in an ultrasound probe of two-dimensional array type, in the present embodiment.
Figure 8B:
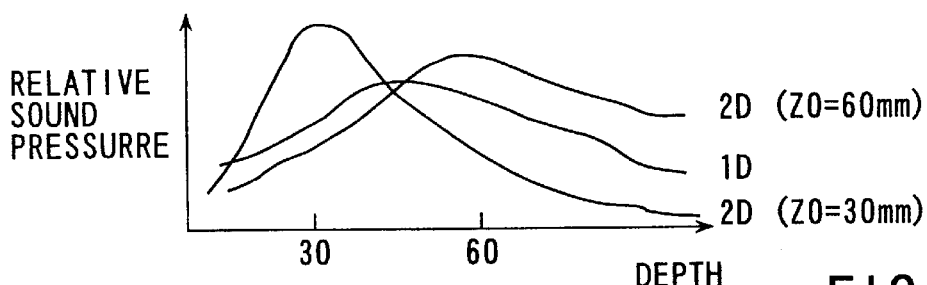
FIG. 8B is a graph showing a sound pressure distribution (2D) of a harmonics wave where a strong-focus condition is applied to both of X- and Y-directions, and a sound pressure distribution (1D) of a harmonics wave where a strong-focus condition is applied to one of the X- and Y-directions in the present embodiment.

As described above, the two-dimensional array type shown in FIG. 8A may be adopted to the ultrasound probe 2. The ultrasound wave can be converged much more than the case of one-dimensional array type, by adopting the same focus point in both the X- and Y-directions in the two-dimensional array type probe. In this manner, the harmonics wave can be generated efficiently. That is, in the one-dimensional array, only the focus in the scanning direction (in the lateral direction) is variable since the focus of the lens direction is fixed. In case where the lens focus is fixed to 60 mm, for example, a sharp convergence sound field cannot be obtained as shown in FIG. 8A even if the strong-focus is adopted with respect to a point of short distance, but the distribution is so loose that a peak lies in the middle between both points.

Meanwhile, in the two-dimensional array type, the focus depth can be controlled both in the elevating direction and the scanning direction, and it is possible to generate efficiently the harmonics wave and to obtain a tissue harmonics image with high quality.

Meanwhile, there may be a case that the region of interest is positioned at a place shallower than the focus even if an ultrasound wave is generated with a very high focal strength ratio. To respond to this case, an acoustic coupler is provided here for the probe 2.

Figure 9A:
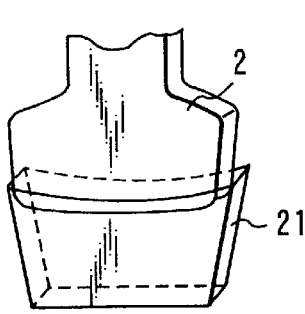
FIG. 9A is a view showing an outer appearance of an acoustic coupler in the present embodiment.
Figure 9B:
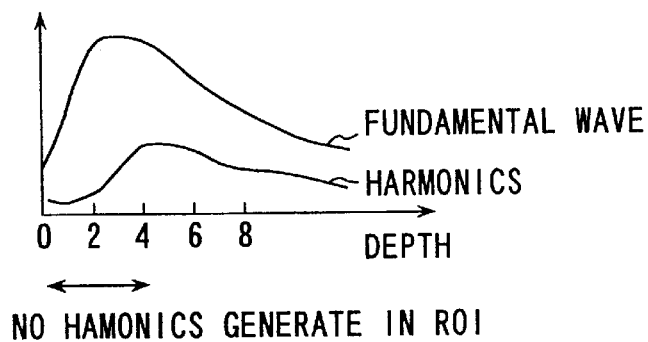
FIG. 9B is a graph showing sound pressure distributions where the acoustic coupler is not attached to the ultrasound probe in the present embodiment.
Figure 9C:
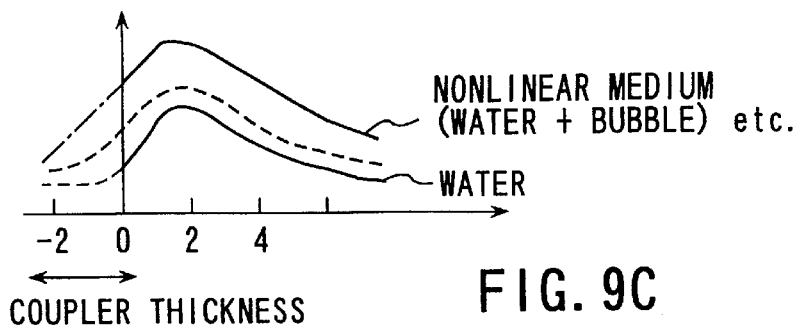
FIG. 9C is a graph showing sound pressure distributions where the acoustic coupler is attached to the ultrasound probe in the present embodiment.

FIG. 9A shows an outer appearance of the acoustic coupler. This acoustic coupler 21 is constituted by enclosing at least water mixed with micro bubbles or a gelatinous non-linear medium through which an ultrasound wave propagates non-linearly thereby generating many harmonics waves, in a casing. If the coupler 21 is not equipped as shown in FIG. 9B, no harmonics wave is generated from a very shallow region at about 1 to 2 cm from the surface of a body. However, by attaching this coupler 21 to the transmission/receiving surface of the probe 2, the distance from the top end of the probe 2 to the organic body can be substantially extended and a harmonics wave can be efficiently generated even in a close region by the harmonics component generated therebetween, as shown in FIG. 9C. Therefore, a tissue harmonics image can be generated even in a shallow region.

Figure 10:
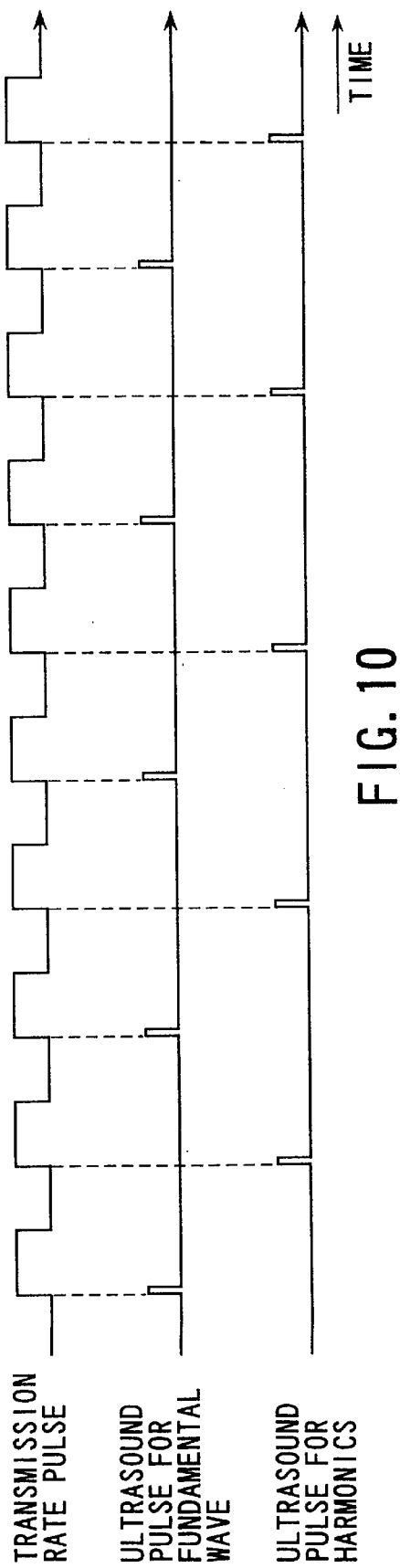
FIG. 10 is a chart showing a transmission operation of switching an ultrasound pulse for a fundamental wave and an ultrasound pulse for harmonics alternately for every transmission rate, in the present embodiment.
Figure 11:
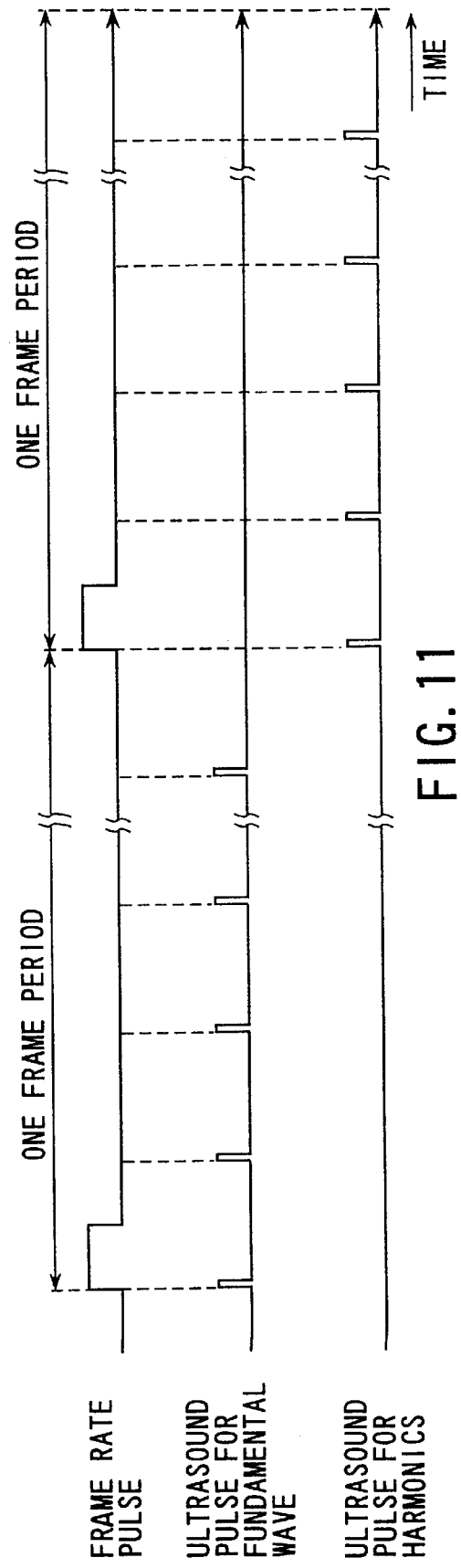
FIG. 11 is a chart showing a transmission operation of switching an ultrasound pulse for a fundamental wave and an ultrasound pulse for harmonics alternately in accordance with the frame rate, in the present embodiment.
Figure 12:
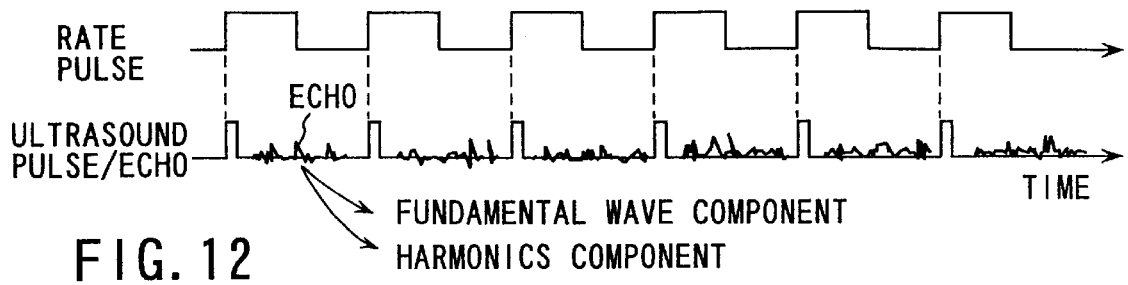
FIG. 12 is a chart showing an operation of transmitting a common ultrasound pulse in the present embodiment.

In this case, the fundamental wave mode and the harmonics mode may be arranged to be switched when an operator switches the mode through a mode selector 13. Or, as shown in FIG. 10, the modes may be switched alternately for every ultrasound wave in accordance with the rate pulse which determines the transmission timing of the ultrasound wave. Or, as shown in FIG. 11, the modes may be switched alternately for every frame in accordance with the frame rate pulse. Further, as shown in FIG. 12, one same echo signal may be distributed to two filters 4 and 5 without switching the mode, and images may be respectively generated from signals which have passed the filters. However, it is desirable that both images are formed with use of separate transmission/receiving operations by switching the mode, in order to obtain optimum image quality for each image. That is, to obtain optimum image quality for each image, the transmission conditions such as the diameter of the transmission opening, it is desirable that the focus depth of the ultrasound wave, the transmission frequency, and the like should are set independently.

Figure 13A:
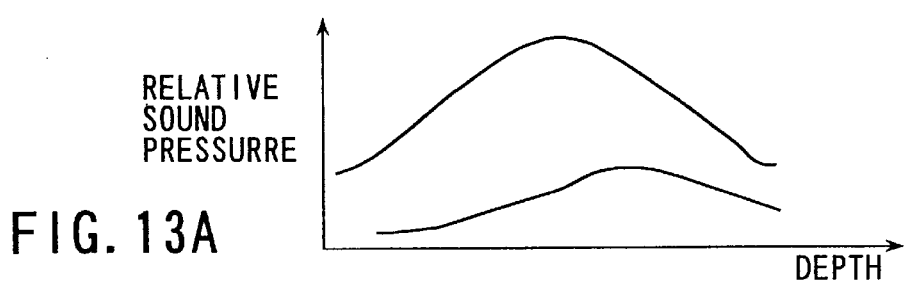
FIG. 13A is a graph showing sound pressure distributions of a fundamental wave and a harmonics wave in the present embodiment.
Figure 13B:
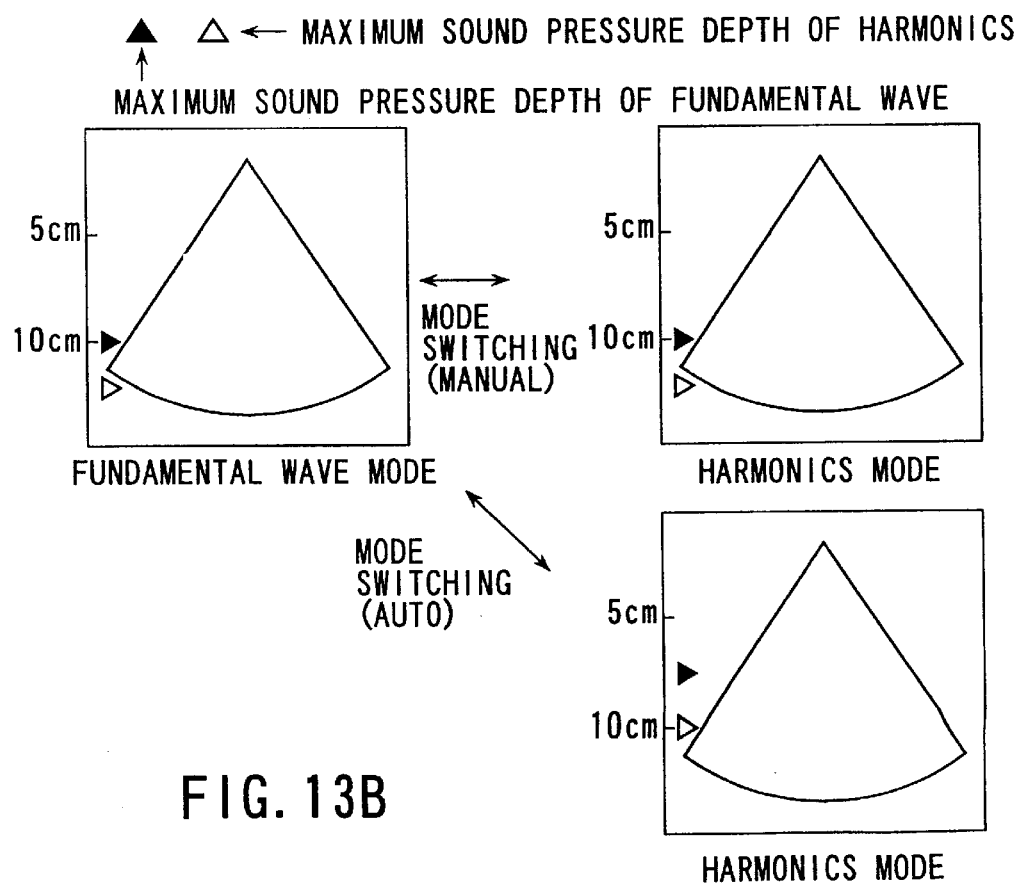
FIG. 13B is a view showing display examples of a maximum sound pressure point marker in the present embodiment.

Next, image display will be explained below. The display is characterized in that the maximum sound pressure point of the harmonics component which can be obtained form the transmission condition by the calculator 14 is presented to an observer. As shown in FIG. 13A, the depths of the maximum sound pressure points may be expressed by markers with respect to the sound pressure distribution of the fundamental wave and that of the harmonics wave, respectively. Or, as shown in FIG. 13B, such markers may be added to the image depending on the fundamental wave component in the fundamental wave mode and the image depending on the harmonics component in the harmonics mode, respectively. Since the maximum sound pressure points are thus presented, the operator can obtain a harmonics image with high quality in the harmonics mode, for example, by manually matching the maximum sound pressure point with a region of interest.

Figure 14:
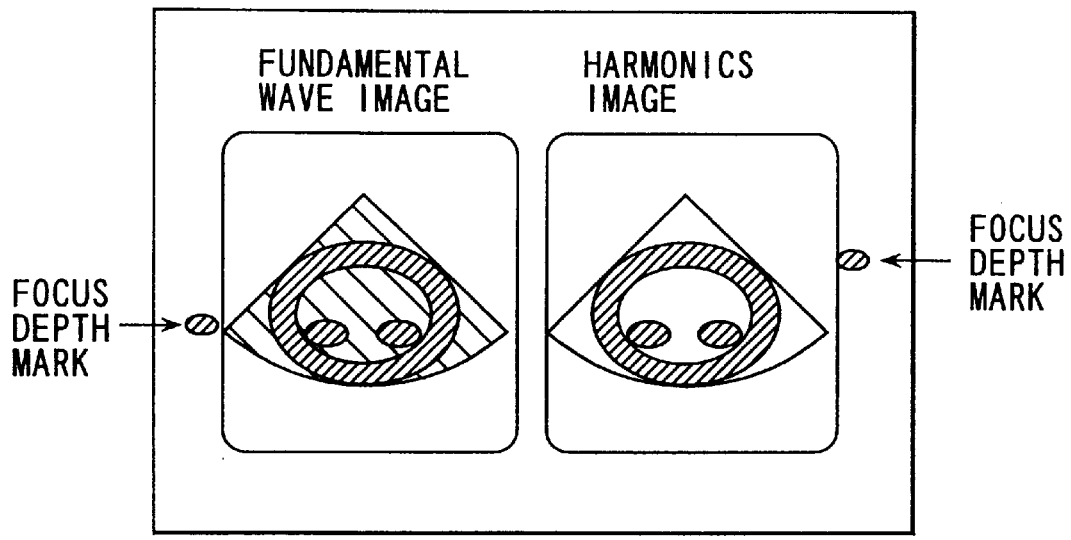
FIG. 14 is a view showing an example of parallel display of a fundamental wave image and a harmonics image in the present embodiment.

Also, as shown in FIG. 14, a B-mode image (which is a fundamental wave image) mainly based on the fundamental wave component and a B-mode image (which is a harmonics image) mainly based on the harmonics wave component in the harmonics mode may be simultaneously displayed in parallel on one same screen. At this time, it is preferable to mark a marker indicating the depth of the focus of the ultrasound wave since whether or not the maximum sound pressure points are matched with each other can then be grasped.

Figure 15:
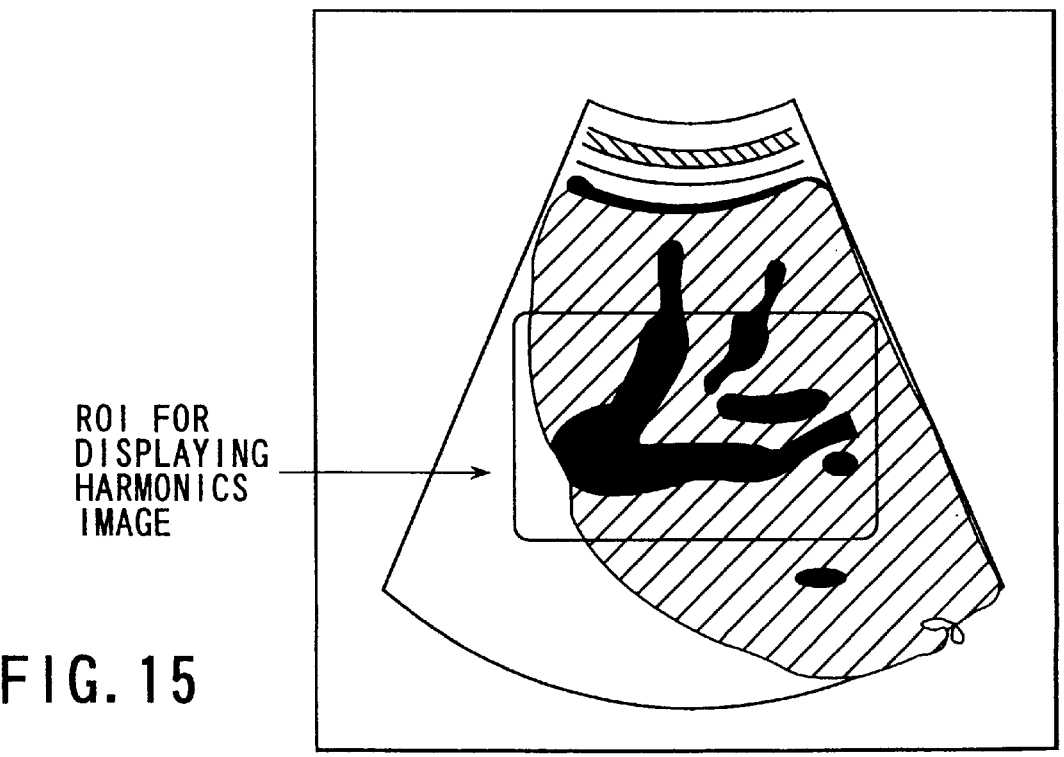
FIG. 15 is a view showing an example of partially synthesized display of a fundamental wave image and a harmonics image in the present embodiment.

Further, in case of simultaneously displaying a fundamental wave image and a harmonics wave image, both images may be partially synthesized as shown in FIG. 15. More specifically, the region of interest may be expressed with use of the harmonics wave image while the other region than the region of interest may be expressed and displayed with use of the fundamental wave image. This partially synthesized display is capable of compensating for a drawback of a harmonics image that the image quality of a harmonics image is principally low at a close portion and at a distant portion. Therefore, high quality can be attained from a close region to a distant region.

Figure 16:
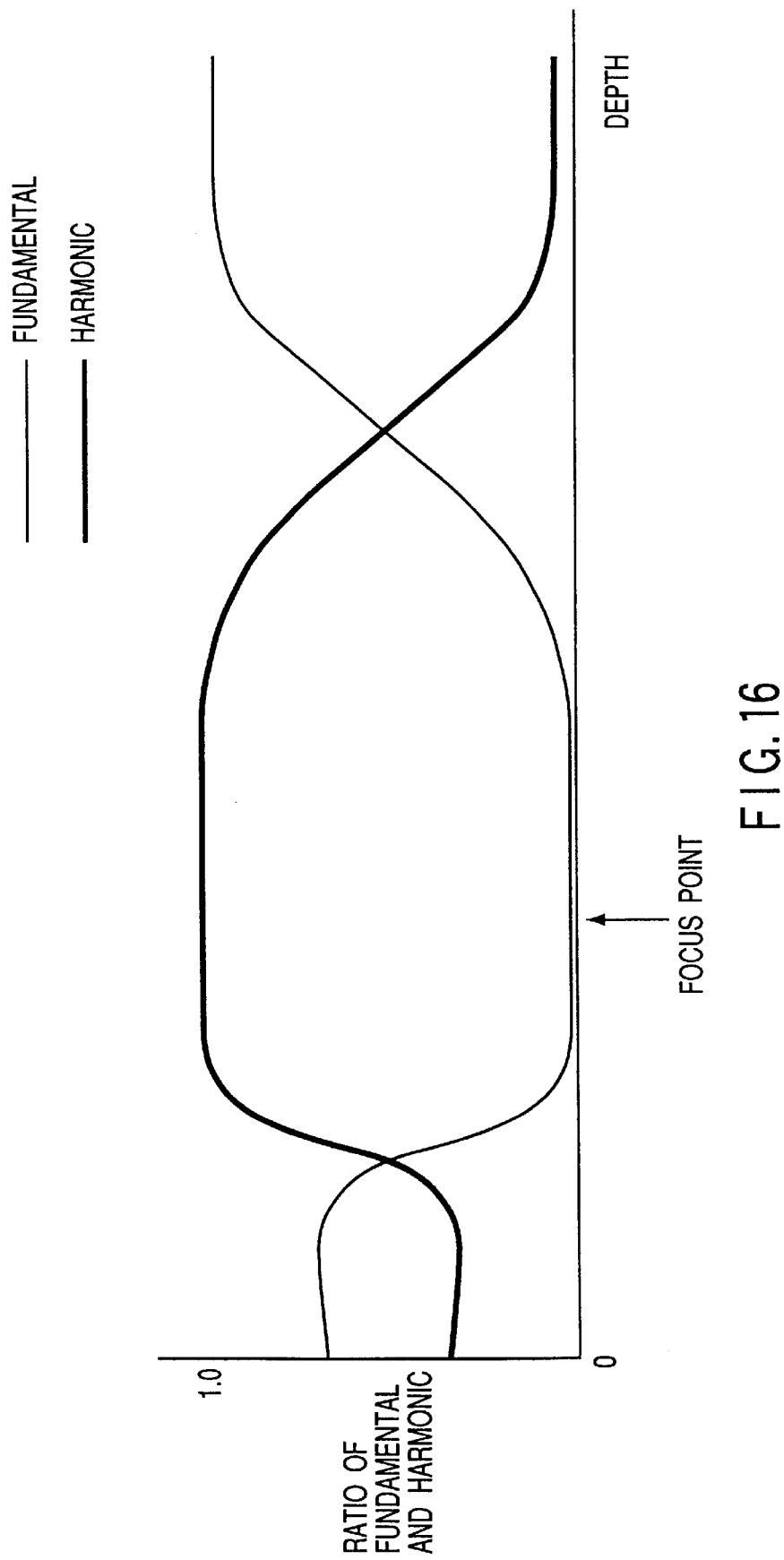
FIG. 16 is a view showing the synthesized ratio of a fundamental component and a harmonic component.

The basic-wave component and the harmonic component are synthesized, by applying the multiplication coefficient shown in FIG. 16. In case of simultaneously displaying a fundamental imaging and a harmonic imaging, both images may be partially synthesized as shown in FIG. 15. The synthesized ratio of a fundamental component and a harmonic component is variable along the depth as shown in FIG. 16. The ratio of the harmonic image to the basic-wave image is decreased in the short- and long-range parts of the image, because the harmonic component is small in these parts of the image. By contrast, in the intermediate-range part of the image, the ratio of the harmonic image is decreased. In the boundary between the short- and intermediate-range parts and also in the boundary between the intermediate- and long-range parts, the ratio of the harmonic image to the basic-wave image is gradually changed so that the parts of the image may smoothly merge with one another. A marker or the like may be used or not used to identify that part of the image which corresponds to the region of interest.

The harmonics component has been explained as a harmonics component which is obtained by multiplying the fundamental frequency f0 by an integer and which is particularly a secondary harmonics component twice higher than the fundamental frequency f0. However, the ultrasound wave may be transmitted with use of at least two fundamental frequencies, and the harmonics component may be a frequency component of a sum or difference between harmonics components of the two kinds of fundamental frequencies, or may be a frequency component of a sum or difference between any of the two basic frequencies and a corresponding harmonics component thereof.

The present invention is not limited to the above embodiments but may be modified variously in practice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasound diagnosis apparatus comprising:
   a multi-channel type ultrasound probe;
   a transmitting/receiving device for transmitting an ultrasound wave to a target object through the ultrasound probe and for receiving an echo signal returning from the target object through the ultrasound probe;

a filter for extracting a fundamental wave component from the echo signal;

a filter for extracting a harmonics component from the echo signal;

a processor for generating an image based on the extracted fundamental wave component in a fundamental wave mode, and for generating an image based on the extracted harmonics component in a harmonics mode; and a controller for controlling said transmitting/receiving device such that a focal strength ratio of the ultrasound wave in the harmonics mode differs from a focal strength ratio of the ultrasound wave in the fundamental wave mode.

2. An apparatus according to claim 1, wherein the focal strength ratio in the harmonics mode is rendered higher than the focal strength ratio in said fundamental wave mode, through control by the controller.

3. An apparatus according to claim 1, wherein a focus of the ultrasound wave is located at a region of interest in the fundamental wave mode and at a position shallower than the region of interest in the harmonics mode, through control by said controller.

4. An apparatus according to claim 1, wherein a focus of the ultrasound wave is located at a position shallower than a focus of the ultrasound wave in the fundamental wave mode through control by said controller.

5. An apparatus according to claim 1, wherein when the fundamental wave mode is switched to the harmonics mode, a focus of the ultrasound wave is switched to a shallow position through control by said controller.

6. An apparatus according to claim 1, wherein the ultrasound wave is transmitted to have a combination focus, in the harmonics mode, through control by said controller.

7. An apparatus according to claim 1, wherein the focal strength ratio of the ultrasound wave in the fundamental wave mode is set to 0.3 or less and is set to a value higher than 0.3 in the harmonics mode, through control by said controller, and the focal strength ratio of the ultrasound wave is obtained by D/Z0 where D is a transmission diameter of said ultrasound probe and Z0 is a focus depth of the ultrasound wave.

8. An apparatus according to claim 1, wherein a transmission diameter of said ultrasound probe in the harmonics mode is set to be different from that in the fundamental wave mode, through control by said controller.

9. An apparatus according to claim 1, wherein a plurality of channels driven in the fundamental wave mode are adjacent to each other and a plurality of channels driven in the harmonics mode are interspersed through control by said controller.

10. An apparatus according to claim 1, wherein a plurality of channels are driven in a subtractive manner in the harmonics mode, through control by said controller.

11. An apparatus according to claim 1, wherein a plurality of channels driven in the harmonics mode are interspersed in at least one of two perpendicular axes through control by said controller.

12. An ultrasound diagnosis apparatus comprising:

a transmitting/receiving device for transmitting an ultrasound wave to a target object and for receiving an echo signal returning from the target object, the ultrasound wave including at least two kinds of fundamental frequencies;

a filter for extracting a specific frequency component from the echo signal, the specific frequency component including at least one of a frequency of a sum of the two kinds of fundamental frequencies, a frequency of a difference between the two kinds of fundamental frequencies, and a frequency of a difference between frequencies defined by multiplying the two kinds of fundamental frequencies by an integer; and a processor for generating an image based on the extracted specific frequency component.

13. An ultrasound diagnosis apparatus comprising:

a multi-channel type ultrasound probe;

a transmitting/receiving device for transmitting an ultrasound wave to a target object through the ultrasound probe and for receiving an echo signal returning from the target object through the ultrasound probe;

a filter for extracting a fundamental wave component from the echo signal;

a filter for extracting a harmonics component from the echo signal;

a processor for generating an image based on the extracted fundamental wave component in a fundamental wave mode, and for generating an image based on the extracted harmonics component in a harmonics mode; and a controller for controlling said transmitting/receiving device such that a transmission diameter of said ultrasound probe in the harmonics mode differs from a transmission diameter of said ultrasound probe in the fundamental wave mode.

14. An ultrasound diagnosis apparatus comprising:

an ultrasound probe;

a transmitting/receiving device for transmitting an ultrasound wave to a target object through said ultrasound probe and for receiving an echo signal returning from the target object through said ultrasound probe;

a filter for extracting a fundamental wave component from the echo signal;

a filter for extracting a harmonics component from the echo signal;

a processor for generating an image based on the extracted fundamental wave component in a fundamental wave mode, and for generating an image based on the extracted harmonics component in a harmonics mode; and a controller for controlling said transmitting/receiving device such that a focus depth of the ultrasound wave in the harmonics mode differs from a focus depth of the ultrasound wave in the fundamental wave mode.

15. An ultrasound diagnosis apparatus comprising:

an ultrasound probe;

a transmitting/receiving device for transmitting an ultrasound wave to a target object through said ultrasound probe and for receiving an echo signal returning from the target object through said ultrasound probe;

a filter for extracting a fundamental wave component from the echo signal;

a filter for extracting a harmonics component from the echo signal;

a processor for generating an image based on the extracted fundamental wave component in a fundamental wave mode, and for generating an image based on the extracted harmonics component in a harmonics mode; and a controller for controlling said transmitting/receiving device such that a frequency of the ultrasound wave in the harmonics mode differs from a frequency of the ultrasound wave in the fundamental wave mode.

16. An ultrasound diagnosis apparatus comprising:

an ultrasound probe;

a transmitting/receiving device for transmitting an ultrasound wave to a target object through said ultrasound probe and for receiving an echo signal returning from the target object through said ultrasound probe;

a filter for extracting a fundamental wave component from the echo signal;

a filter for extracting a harmonics component from the echo signal;

a processor for generating an image based on the extracted fundamental wave component, and for generating an image based on the extracted harmonics component; and a display for displaying the generated image based on the fundamental wave component and the generated image based on the harmonics component, on one screen.

17. An apparatus according to claim 16, wherein the fundamental wave component and the harmonics component are extracted from one same echo signal.

18. An apparatus according to claim 16, further comprising a controller for controlling said transmitting/receiving device, being capable of changing a transmission condition of the ultrasound wave between when extracting the fundamental wave component and when extracting the harmonics component, through control by said controller, and being capable of changing a transmission condition for the fundamental wave component and a transmission condition for the harmonics component alternately in accordance with a transmission rate.

19. An apparatus according to claim 16, further comprising a controller for controlling said transmitting/receiving device, being capable of changing a transmission condition of the ultrasound wave between when extracting the fundamental wave component and when extracting the harmonics component, through control by said controller, and being capable of changing a transmission condition for the fundamental wave component and a transmission condition for the harmonics component alternately in accordance with a frame rate.

20. An apparatus according to claim 16, wherein said processor synthesizes a marker indicating a depth at which a maximum sound pressure of a harmonic wave is obtained, into the image based on the harmonics component.

21. An apparatus according to claim 16, wherein the images based on the fundamental wave component and the harmonics component are partially synthesized.

22. An apparatus according to claim 16, wherein the image based on the harmonics component is inserted in a region of interest in the image based on the fundamental wave component.

23. An apparatus according to claim 16, further comprising a controller for changing a transmission condition of the ultrasound wave between when extracting the fundamental wave component and when extracting the harmonics component, and a processor for adding an echo signal obtained under a transmission condition for the fundamental wave component and an echo signal obtained under a transmission condition for the harmonics component to each other.

24. An apparatus according to claim 23, wherein said processor adds the echo signal of the fundamental component and the echo signal of the harmonic component to each other.

25. An apparatus according to claim 23, wherein said processor adds the echo signal obtained under the transmission condition for the fundamental wave component and the echo signal obtained under the transmission condition for the harmonics component to each other, at a ratio which varies for every depth.

* * * * *

UNITED STATES PATENT AND TRADEMARK OFFICE
CERTIFICATE OF CORRECTION

PATENT NO. : 6,146,330
DATED : November 14, 2000
INVENTOR(S): Hiroyoki TSUJINO, et al.

It is certified that an error appears in the above-identified patent and that said Letters Patent is hereby corrected as shown below:

On the title page, item [75], the 1st inventors name is incorrect and the 2nd inventors residence is incorrect, item [75] should read as follows:

--[75] Inventors: Hiroyuki Tsujino, Cleveland, Ohio; Yoshitaka Mine, Nasu-gun; Takuya Sasaki, Otawara, both of Japan--

Signed and Sealed this

First Day of May, 2001

NICHOLAS P. GODICI

*Attest:*

*Attesting Officer*   *Acting Director of the United States Patent and Trademark Office*